United States Patent [19]

Davis

[11] Patent Number: 4,881,348
[45] Date of Patent: Nov. 21, 1989

[54] CERAMIC BRICK

[75] Inventor: Thomas E. Davis, Ann Arbor, Mich.
[73] Assignee: Visuron, Inc., a Mich. Corp., Essexville, Mich.
[21] Appl. No.: 204,846
[22] Filed: Jun. 10, 1988
[51] Int. Cl.[4] ............................................. E04B 1/60
[52] U.S. Cl. .................................. 52/127.7; 110/338; 52/511; 52/715
[58] Field of Search ................. 52/127.7, 506, 511, 52/589, 715; 110/338, 339, 340

[56] References Cited

U.S. PATENT DOCUMENTS

| 22,108 | 6/1942 | Crecca | 114/84 |
|---|---|---|---|
| 3,350,832 | 11/1967 | Persson | 52/506 |
| 3,624,344 | 11/1971 | Kutzer | 219/127 |
| 3,687,093 | 8/1972 | Byrd, Jr. | 110/1 |
| 3,747,291 | 7/1973 | Perigo et al. | 52/127 |
| 4,136,625 | 1/1979 | Corbet | 110/339 X |
| 4,137,681 | 2/1979 | Pasley | 52/506 X |
| 4,520,601 | 6/1985 | Stacey, Jr. | 52/127 |

Primary Examiner—David A. Scherbel
Assistant Examiner—Jerrold D. Johnson
Attorney, Agent, or Firm—Jay C. Taylor

[57] ABSTRACT

An undeformed weldable insert is inserted into an undercut recess opening at an inner face of an abrasion resistant ceramic brick and thereafter deformed into the undercut and interlocked with the brick. The insert is then welded to a substrate either by inserting a welding rod through a small guide hole into the recess from the abrasion resisting outer surface of the brick and then into guided welding contact with the substrate through a hole in the insert, or by inserting the welding rod through a hole in the substrate opposite the insert. Alternatively the inner face of the brick is overlaid with a fluid hardenable plastic that fills and interlocks with the undercut recess to provide means for bolting or cementing the brick to a substrate to be protected.

27 Claims, 7 Drawing Sheets

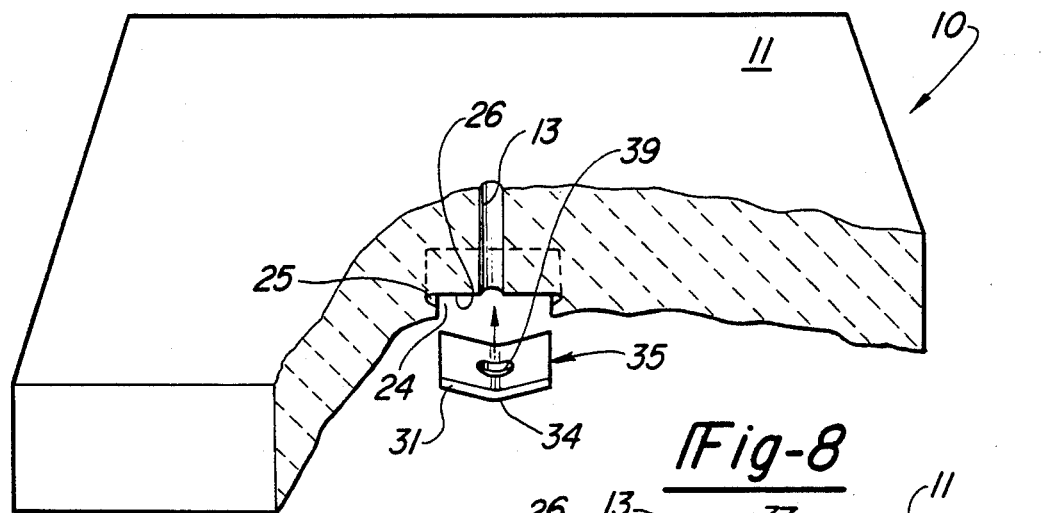
_Fig-8_
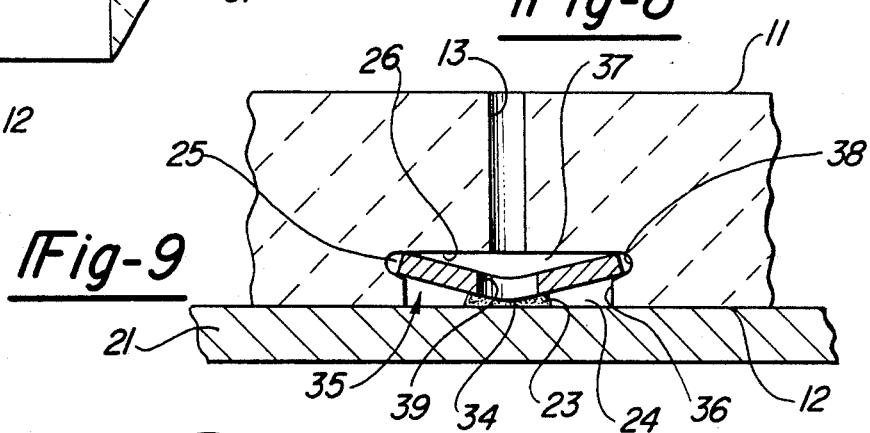
_Fig-9_
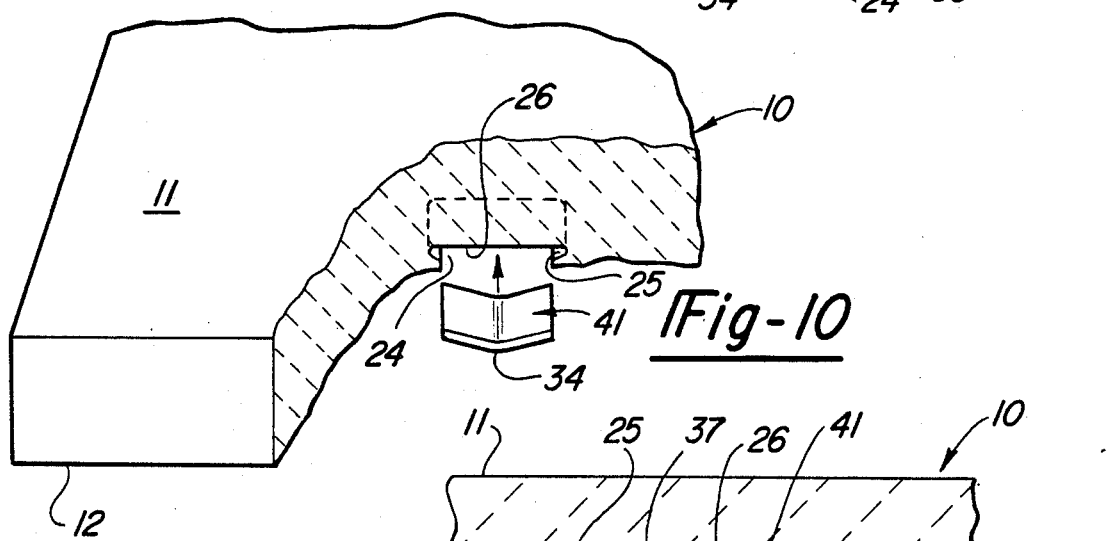
_Fig-10_
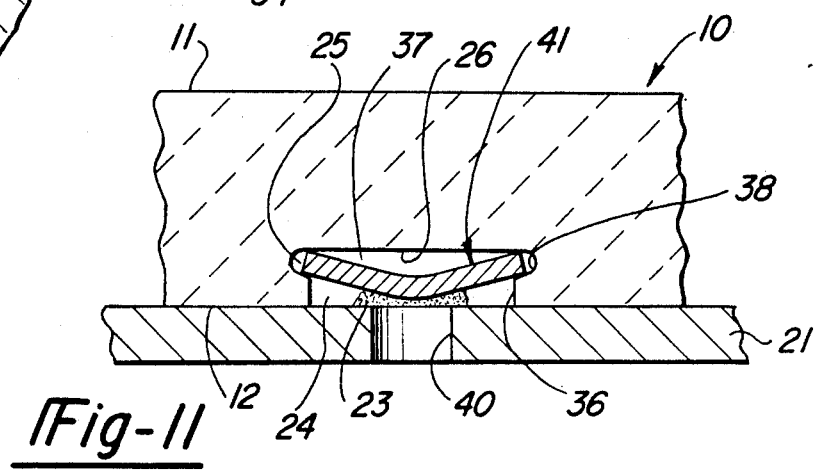
_Fig-11_

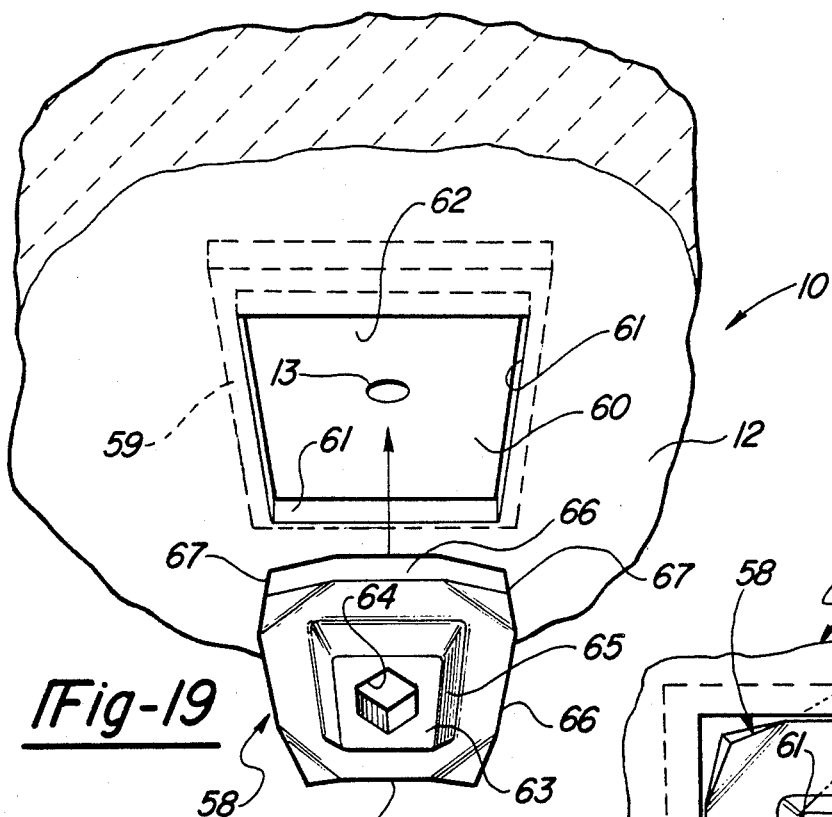
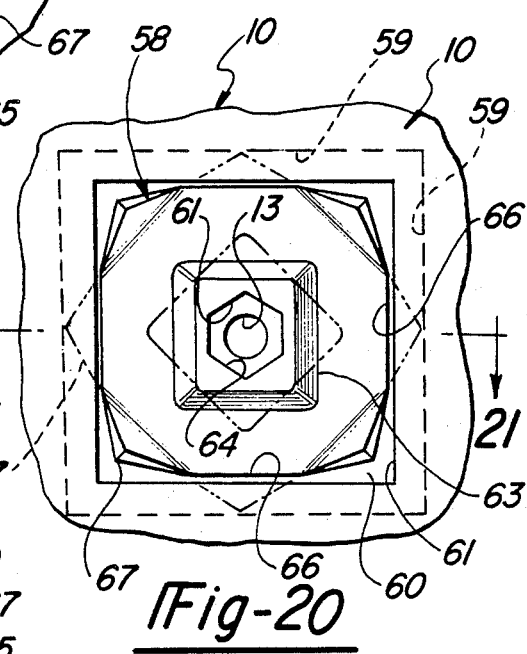
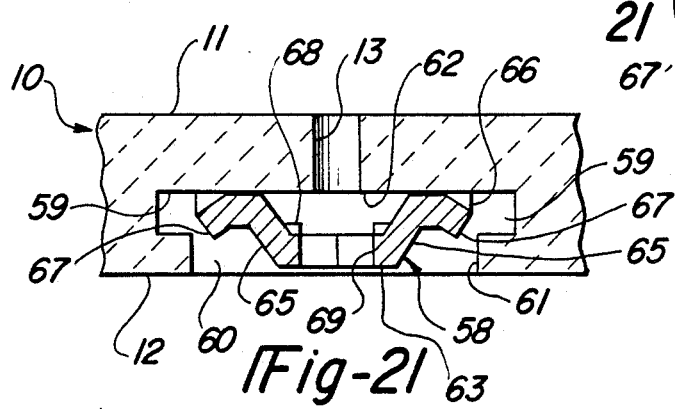
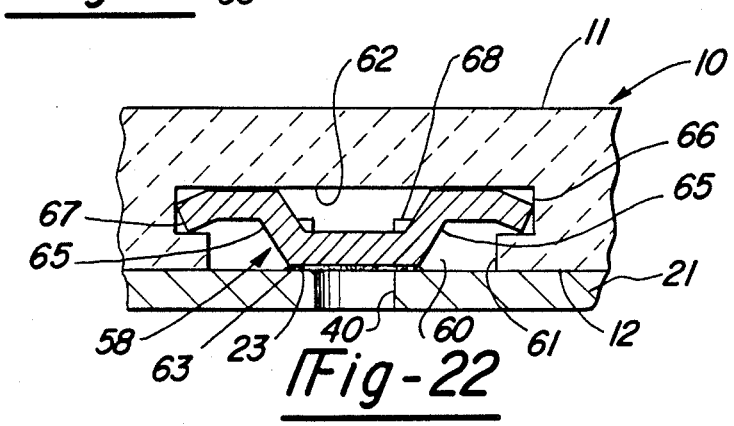

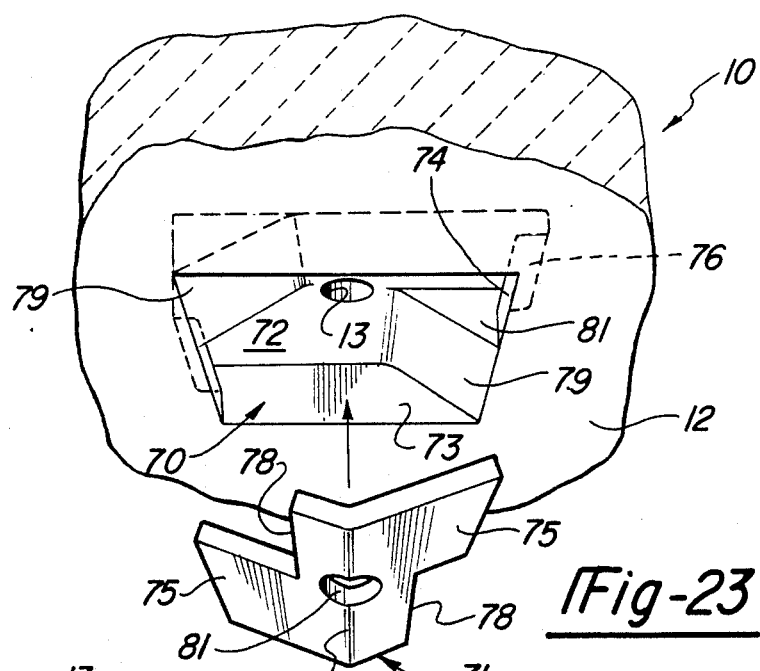
_Fig-23_
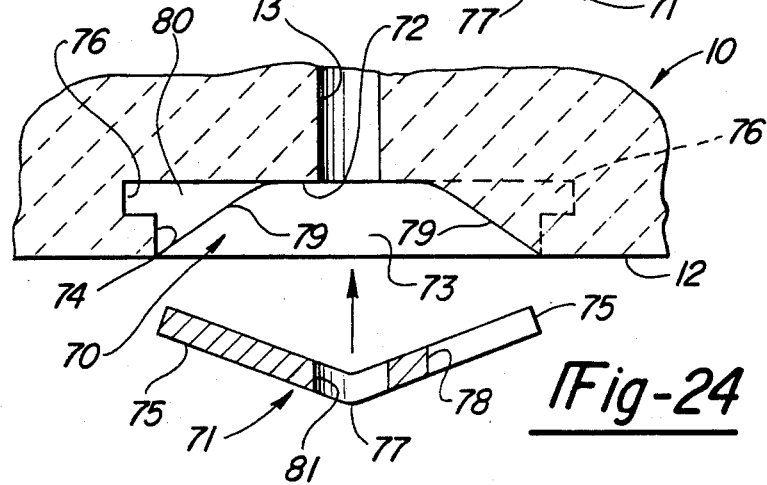
_Fig-24_
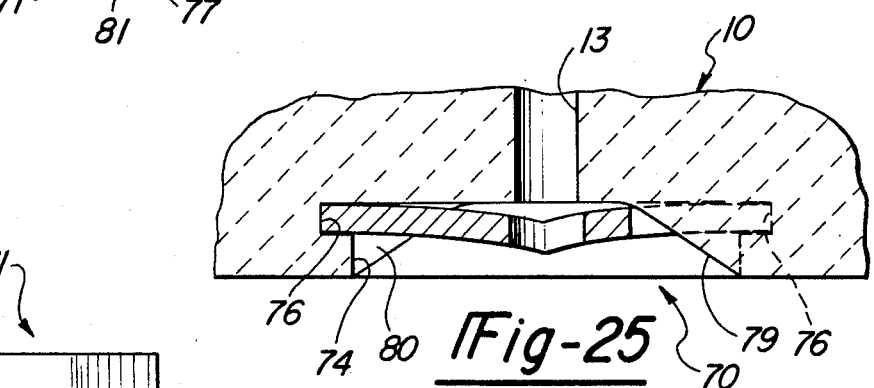
_Fig-25_
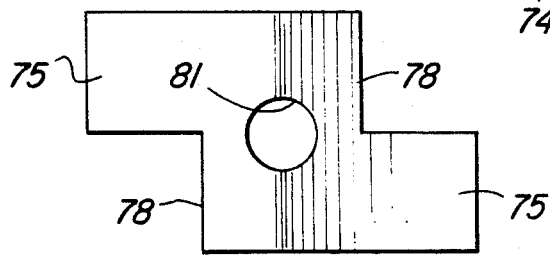
_Fig-26_
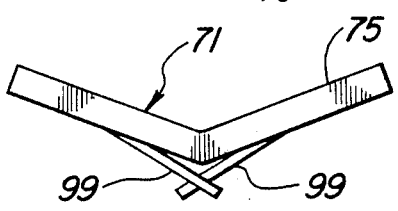
_Fig-27_

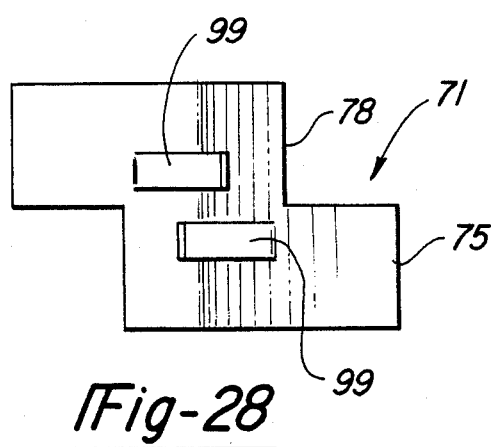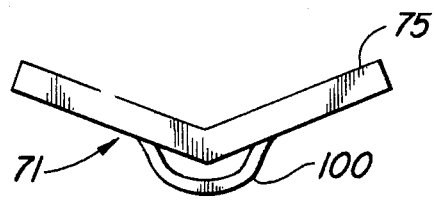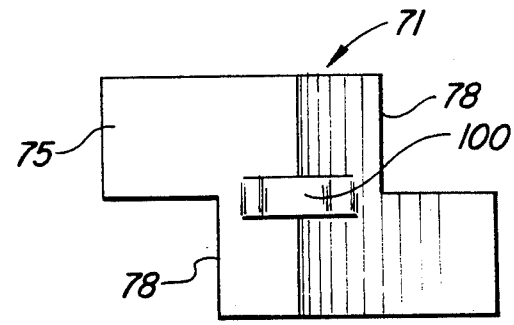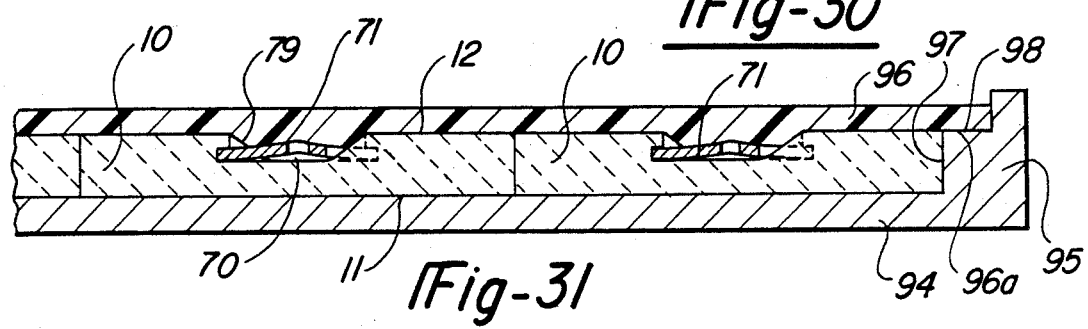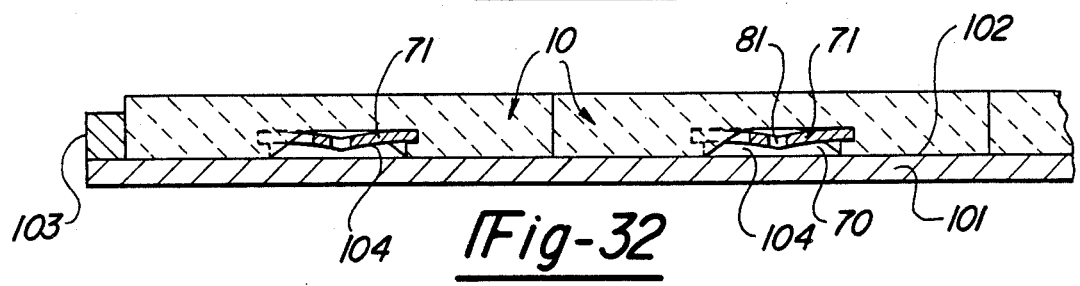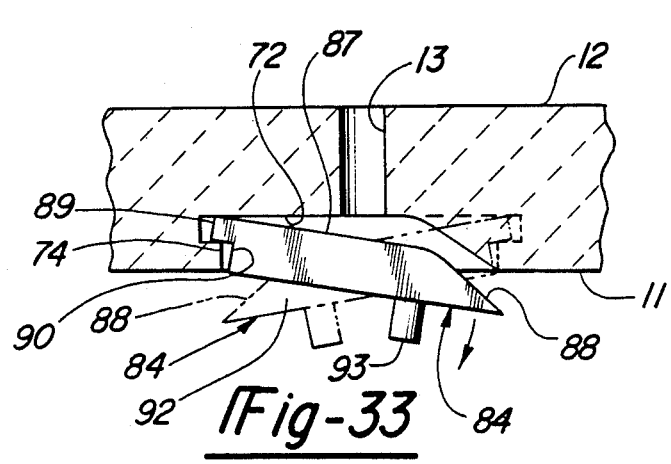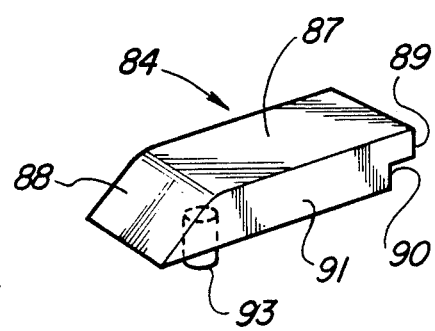

CERAMIC BRICKCERAMIC BRICK

The present invention relates to improvements in a ceramic brick of the type used for providing an impact and/or abrasion resistant lining for a load supporting surface to be protected, to improved means for securing such a brick to the surface, and to improved methods for manufacturing such a brick and for securing the same to the surface, which may comprise by way of example the wall of a pipe or a chute exposed to abrasion, or surface portions of a military vehicle exposed to shrapnel or small arms fire.

BACKGROUND AND OBJECTS OF THE INVENTION

It is conventional in industries involving the transportation or storage of abrasive materials, such as coal, various mineral ores, or other abrasives, to provide a steel backing or liner for the wall or surface to be protected, and thereafter to weld specially prepared abrasion resistant ceramic tile or bricks to the backing.

Such bricks are commonly one inch thick fired silicon ceramic, such as an aluminum-silicon oxide or a silicon carbide compacted under high pressure from a dry powder and optionally with a suitable binder. The typical brick has four by six inch faces, although the dimensions may vary appreciably, say from one-half to two inches in thickness, with faces ranging from less than four inches in the shorter dimension to more than nine inches in the longer dimension. Also the brick may be molded from a molten abrasive resistant material such as basalt or an aluminum-zirconium-silicate.

A common weldable brick is formed with a central welding hole about one inch in diameter that extends through an outer face of the brick and is constricted slightly adjacent to the opposite inner face to confine a weldable metallic insert. The latter is inserted into the larger or unrestricted opening of the welding hole and is retained adjacent to the restricted end by friction. With the welding insert arranged coaxially in the hole, the metal insert is welded to the steel backing or liner, either by conventional MIG (metal inert gas) welding or in rare instances by conventional use of an arc welding rod. Thereafter a cylindrical closure plug is inserted into the unrestricted opening of the welding hole to close the same.

In some instances, it is preferable to weld the metal insert by conventional arc welding to the steel backing or liner, but arc welding is not particularly convenient with the type of brick described because it is difficult to maintain the metal welding insert in a coaxial position at the reduced end of the hole. The welding insert is provided with a central opening through which a welding rod or wire must pass in order to contact the steel wall or backing. When the welding rod is extended through the aforesaid central opening in the welding insert, the latter is frequently knocked out of alignment by the rod and welded in a cocked position to the steel liner. A similar problem arises even during MIG welding when the MIG welding wire is inserted through the welding insert into contact with the steel backing or liner to which the brick is to be secured.

Not only will the resulting weld be less secure, but the cocked insert in some instances prevents the cylindrical closure plug from fitting flush with the outer surface of the brick. The plug will thus be subjected to excessive abrasion and will rapidly wear away. Furthermore, although the cylindrical plug is usually cemented within the welding hole, it frequently works loose even when it is flush with the outer surface of the brick, whereupon the metallic insert will rapidly wear away by the abrasive action and the entire brick will be dislodged.

Even if the metallic insert is properly located and welded to the steel backing, the cylindrical closure plug cannot extend axially within the welding hole to the extent desired because a certain amount of space must be allowed to accommodate the situation when the metallic insert is cocked out of its coaxial alignment within the hole. Accordingly, the wear resistant thickness of the brick at the region of the approximately one-inch diameter welding hole will be considerably less than the thickness of the adjacent portions of the brick. When the thinner cylindrical plug eventually abrades away, the metallic welding insert is rapidly disintegrated by abrasion at the exposed hole.

In addition, the one inch centrally located hole tends to weaken the brick across the diameter of the hole. In consequence, the comparatively brittle ceramic brick tends to break when subjected to impact during use, or when the installer of the brick attempts to break off a portion in order to provide a close fit near the edge of the wall to be lined. In that event, the brick tends to crack at the middle through the one inch hole instead of at the region where the craftsman's hammer strikes the brick.

An additional objection to bricks of the type described is that three loose pieces are required, i.e., the brick, the insert, and the cylidrical plug. The insert may be cemented in place, but the cementing involves an additional operation and increases the cost of the brick.

Important objects of the present invention are to provide an improved brick of the general type described and a method of using it that avoid the above noted objections; and in particular to provide an improved weldable ceramic brick having an insert receiving recess opening at its inner face, i.e. the face that confronts the wall or substrate to be protected, to receive a deformable weldable insert, which after being inserted into the recess through its opening at the inner face of the brick, is deformed into undercut portions of the recess by force applied against portions of the insert exposed at the latter opening, thereby to frictionally and mechanically interlock the insert and brick.

Another important object is to provide a weldable brick where, instead of a one-inch hole extending approximately through the entire brick, only a small diameter guide hole large enough for insertion of a welding wire as customarily used in MIG welding, or a slightly larger diameter guide hole for a conventional arc welding rod, extends centrally through the brick from its outer face toward its inner face.

The guide hole may be as small as approximately 0.035 inches in diameter and no larger than one-eighth of an inch in diameter where MIG welding is available, or may be approximately three-sixteenths of an inch in diameter if it is required for guiding a conventional arc welding rod, and may extend about three-quarters of an inch into a one-inch thick brick from its outer face, whereupon the guide hole enlarges radially to a maximum of approximately a square inch in cross sectional area to provide a recess having an insert receiving opening at the aforesaid inner face of the brick and having a plane ceiling normal to the axis of the guide hole and parallel to the inner and outer faces of the brick. The periphery of the recess adjacent to its ceiling is undercut into the sidewalls of the recess to provide a larger cross sectional area than the insert receiving opening at the inner face of the brick. Thus the maximum radial or transverse dimension of the recess comprises an enlargement or an undercut with respect to the aforesaid insert receiving opening for receiving edge portions of a sheet steel welding insert.

A one-piece metallic welding insert is provided with a plane base having a central hole coaxial with and sufficiently larger than the guide hole through the brick to enable free passage of a welding wire or rod. The base also has diverging prongs or outer edge portions that define an area approximately the same as the area of the insert receiving opening, but slightly less to enable insertion of the insert freely into the recess through that opening. The prongs or outer edge portions are dimensioned so that when the insert is inserted, prongs first, through the insert receiving opening, and the base of the insert is pressed toward the ceiling of the recess, the prongs will slidably engage the ceiling and be deformed radially or transversely of the guide hole into the undercut portion of the recess. Thus the insert will be interlocked rigidly within the brick. At the interlocked position, the plane of the base of the insert will be spaced sufficiently from the inner surface of the brick and within the recess to enable formation of a pool of molten welding rod between the base and the steel backing for the chute or other wall to be protected.

In a modified form, a metallic insert has its deformable outer edge portions generally square in section transverse to the guide hole. The insert receiving recess is also square in cross section to closely receive the insert and is undercut adjacent to its ceiling to receive the corners of the square edge portions when the insert is located within the recess and rotated 45°. In this situation the corners of the square edge portions prior to the rotation decline slightly away from the ceiling. Thus when the insert is rotated, the edge portions are deformed or bent upwardly toward the ceiling by cam action as they enter the undercuts. The resulting deformation of the insert frictionally interlocks it within the recess. The central hole in the base of the insert and coaxial with the guide hole is preferably out-of-round for receiving a mating tool to enable rotation and interlocking of the insert within the recess.

After the metallic welding insert is deformed and interlocked within the recess, the brick may be shipped as a weldable unit to the site where welding is desired. The brick is then held with its inner face adjacent to the steel wall or backing to be protected and welded in place by conventional MIG or arc welding. A conventional welding rod or MIG welding wire is inserted through the small guide hole in the brick and thereby guided through the coaxial hole in the base of the welding insert and into welding contact with the steel backing without touching the insert.

The weldable brick described is particularly suitable for conventional arc welding because the small diameter guide hole guides the arc welding rod coaxially through the larger hole in the base of the welding insert and into welding contact with the steel liner without disrupting the coaxial alignment of the insert. The heat of the arc melts the tip of the welding rod which flows into contact with both the base of the insert and the steel backing to complete the weld. However where MIG welding equipment is available, the brick described can also be readily welded similarly to the steel backing by conventional MIG welding.

By virtue of the improved construction comprising the deformed welding insert frictionally and mechanically interlocked within the undercut recess, the insert cannot be inadvertently pushed out of its alignment within the recess and a weld of optimum strength and effectiveness is thus readily accomplished. Welding the brick at any angle of support to the steel backing and especially overhead is facilitated with consequent reduced welding time and labor cost. After the weld, the small diameter guide hole through the brick may be sealed with a caulking material, but such caulking is not essential because the hole is too small to cause serious damage to the brick by abrasive material moving across its outer surface. Also by virtue of the undercut recess for the welding insert, occupying approximately only one-forth of the thickness of the brick, the major thickness of the brick is available for resisting abrasion and the abrasion resistant life of the ceramic brick is materially increased. Likewise a plane of weakness through the diameter of the recess for the welding insert is minimized because that recess only extends approximately one-forth of the thickness of an inch thick brick, whereby the latter can be hammer cut to a desired size by a craftsmen without breaking the brick through the recess.

In a typical construction, the small diameter guide hole for the welding rod and the recess for the welding insert is formed while the brick is soft, i.e. during its initial formation by conventional molding processes, especially when the recess for the welding insert is formed with a rectangular cross section. Conventional cam operated die parts can then be used to form the undercut recess and thereafter retracted from the molded brick. The brick can also be molded with only the guide hole for the welding rod or wire extending therethrough. Thereafter, while the brick is still soft and before being fired, an undercut insert receiving recess may be cut in the inner face of the brick coaxially with the guide hole. In either case, after the brick is formed to the desired shape for receiving the welding insert, it is fired and hardened by conventional processes.

Another object of this invention is to provide an improved weldable brick comprising the inserted, deformed, and interlocked welding insert substantially as described, and a method of using the same wherein the guide hole may be eliminated in situations where welding access to the exterior of the sheet steel wall or substrate to be protected is convenient. In such a situation, a hole is burned or otherwise formed through the sheet steel wall from its outside, i.e. its surface opposite the surface to be protected. The latter hole is dimensioned to enable insertion of a welding rod or MIG welding wire and is located coaxially with the center of the welding insert in the brick. Thereafter the welding rod or wire is inserted through the hole in the steel wall and into contact with the edges of the latter hole to form a molten pool joining the steel wall and metallic insert interlocked within the brick as described above. Also in the situation described, the base of the metallic insert need not be provided with a central hole for passage of a welding wire or rod.

Another object of this invention is to provide weldable bricks of the type described but dimensioned for lining a pipe used for conveying an abrasive slurry or pneumatically transporting abrasive particulates. It has been conventional to line such pipes with abrasion resistant ceramic bricks extending longitudinally of the pipe and having truncated triangular cross sections arranged to fit closely together adjacent to the pipe's inner periphery. Commonly the bricks would be cemented in place, as for example by forcing cement longitudinally of the pipe within the chordal space between the pipe and each adjacent brick. The cementing often causes small amounts of cement to enter spaces between the bricks, so that the space for the last brick can seldom be predetermined.

When all but one of the bricks are installed around the interior circumference of the pipe, the remaining space is filled by a key brick that locks all of the others in place. In order to assure a tight fit for the key brick, it is frequently diamond cut to size and then hammered into place, an expensive and time consuming procedure. Furthermore, during use of the pipe, the abrasive slurry rapidly wears away the cement between the bricks, such that the key brick sometimes loosens and falls out, whereupon the remaining bricks associated with the loosened key brick also fall out of place.

In many instances where the pipe is used for conducting an abrasive slurry, only a lower portion of the pipe is in contact with the slurry. Consequently the expensive ceramic lining for the upper portions of the pipe, required only because of the key brick, are not used unless the pipe line is disassembled and the individual pipes are rotated at least approximately 120°, then reassembled.

In accordance with the present invention, ceramic bricks shaped overall in accordance with conventional practice, but provided with welding inserts as described, are welded to the inner periphery of the pipe. Thus a key brick is rendered unnecessary and, where feasible, only approximately the lower half of the pipe is lined with the ceramic bricks, with obvious savings in material and labor. Where the type of use requires the entire interior circumference of the pipe to be lined, this is readily accomplished, but a tight and precise fit for the final or "key" brick is unnecessary and the expense of diamond cutting is avoided. Likewise no cement that can readily be abraded away is required to secure the bricks in place, but where cement is used, its abrasion causes no concern because the bricks are secured in place by welding.

In many instances, the abrasive material is highly corrosive, such that metallic pipes or steel walls cannot be employed, even when lined with abrasive resistant bricks as described herein. In such instances the walls and pipes are manufactured from dielectric corrosion resistant materials to which the weldable bricks cannot be welded. It is accordingly another object of this invention to modify such walls or pipes to enable their use with the weldable bricks of the present invention.

Specifically, weldable grommets or buttons made from corrosion resistant material, such as stainless steel for example, are secured within the side walls of the wall or pipe at locations coaxial with the welding inserts of the bricks. Thereafter the welding inserts are welded as described above to the grommets or buttons by otherwise conventional welding technique.

The art involving the molding and firing of ceramic material from which bricks embodying the present invention are made is highly developed and capable of manufacturing weldable bricks as described having undercut insert receiving recesses of various shapes and sizes in accordance with this invention. The brick may be compacted from a dry powder within a multiple part mold under approximately 3500 psi (pounds per square inch) to produce a green unfired brick containing recess forming inserts that when removed leave the desired recess. However the forming mold for the green unfired brick can be complex and may require a number of recess forming mold inserts.

Another important object of this invention is to provide an improved weldable brick of the type described wherein the recess forming inserts can be readily removed from the comparatively soft and friable green brick without damaging it immediately after it is compacted. The resulting insert receiving recess is undercut at its opposite ends, but the undercut at each end is offset laterally from the offset at the opposite end.

At each end of the recess laterally of the undercut at the same end, the recess is defined by an end wall that slopes endwise toward the ceiling from its respective end of the recess opening for approximately 20% or less of the length of the recess, then merges with the recess ceiling. The recess is formed by placing a pair of identical independently removable recess forming inserts side-by-side in the mold. Each removable insert forms a lateral half of the recess, i.e. one lateral portion of the ceiling spacing one sloping wall and the one undercut at the opposite ends of that lateral half. After the powdered material of the brick is compacted under high pressure, each separate recess forming insert is withdrawn from the undercut formed thereby and moved outwardly of the recess as enabled by the associated sloping wall. Thereafter the green brick is fired and hardened.

The weldable insert is preferably formed from a sheet steel blank to provide legs at its opposite ends dimensioned to fit within the opposite undercuts of the recess when deformed therein. In its undeformed conditions, it may be generally V-shaped and is readily insertable through the recess opening, with its legs diverging outwardly at approximately 110° from a central apex of the V toward the recess ceiling. Once inserted, pressure flattens the apex toward the ceiling and thereby forces the opposite ends of the legs into interlocking engagement within the undercuts. The weldable insert may or may not be provided with a central opening for passage of a welding wire or rod, depending on whether or not the brick is to be welded to a supporting wall from the outer face of the brick opposite the recess opening.

The concept of the weldable brick having an undercut recess opening at its inner face an a weldable insert deformed and interlocked within the recess also enables other useful abrasion and shock resistant structures that do not require welding. It is accordingly another important object of the invention to provide recessed bricks as described herein interlocked with either a thermosetting or thermoplastic sheeting or surface without recourse to welding. In one embodiment by way of example, a number of ceramic bricks as described herein are placed outer-face down on the surface of a temporary supporting mold or frame having a peripheral raised border. Thereafter a hardenable liquid plastic, reinforced as for example by glass fibers if desired, is poured over the upwardly opening recesses in the inner faces of the bricks to any desired thickness, say one-quarter inch to an inch or more. The plastic readily fills the recesses and interlocks with the metal welding inserts and, when hardened and removed from the supporting frame, provides an abrasion and bullet resistant panel or structure. The term "plastic" as used herein includes any suitable thermoplastic or thermosetting plastic, including various suitable resins, such as epoxy resins.

The various ceramic bricks may be rectangular or hexagonal in shape for interfitting closely with each other, or may be of any desired shape if such interfitting is not important. The surface of the supporting mold or frame may be shaped so that the resulting abrasive resistant panel or structure will conform to any desired surface to be protected, such as a chute for abrasive materials, or surface portions of a military vehicle. When the abrasion resistant panel is other than flat, the surface area of the ceramic bricks may be comparatively small so that adjacent bricks may conform to various curvatures. Likewise when necessary the panel may obviously be formed between opposing mold parts according to conventional molding practice.

Finally, abrasion or shock resistant panels or structures may be formed as described above without recourse to the above described weldable inserts, merely by emphasizing the undercuts of the recesses in the ceramic bricks. The fluid hardenable plastics will fill the recesses and interlock within the undercuts when hardened.

Other objects of this invention will appear in the following description and appended claims, reference being had to the accompanying drawings forming a part of this specification wherein like reference characters designate corresponding parts in the several views.

THE PRIOR ART

The following patents represent the state of the art as known to applicant.

Re. 22,108 Crecca
3,624,344 Kutzer
3,687,093 Byrd, Jr.
3,747,291 Perigo et al
4,520,601 Stacey, Jr.

Crecca is not concerned with a weldable ceramic brick but shows a ferrule 17 and screw 16 insertable through the upper side of an opening 14 into contact with a metal strip 10 to which the bolt 16 is welded.

Kutzer is concerned with applicant's problem, but he illustrates the conventional art of inserting the retainer 8 into a comparatively large outer opening restricted at the inner face of the brick to hold the retainer 8 in place for welding to the steel plate 4.

Byrd, Jr. and Perigo similarly insert weldable retainers into comparatively large openings through the outer surface of the brick for welding to the steel plate at a restricted inner end of the opening. These patents also disclose the concept of filling the outer surface of the brick with a closure plug, which as noted above is subject to several objections.

Stacey, Jr. is not concerned with the provision of a ceramic brick having a weldable insert deformed into an undercut from the inside of the brick, but it shows a comparatively small diameter passage 22 opening into a recess 24 for the securing means. Like the above noted patents, it is otherwise not concerned with the concept of inserting and deforming a weldable metallic insert into an undercut recess opening at the inner face of a ceramic brick.

THE DRAWINGS

FIG. 8 is a view similar to FIG. 1, illustrating another modification of the invention.

FIG. 9 is a view similar to FIG. 3, illustrating the modification of FIG. 8 in assembled relationship and welded to a steel wall.

FIG. 10 is a view similar to FIG. 8, but illustrating another modification of the invention.

FIG. 11 illustrates the modification of FIG. 10 assembled and welded to a steel wall from its exterior surface opposite from the surface protected by the abrasion resistant brick.

FIG. 19 is a fragmentary perspective bottom view illustrating another modification of a ceramic brick and weldable insert embodying the invention prior to assembly.

FIG. 20 is a view illustrating the embodiment of FIG. 19, showing the weldable insert as initially inserted within a recess in the brick, and prior to be rotated.

FIG. 21 is a sectional view substantially along the line 21—21 of FIG. 20.

FIG. 22 is a sectional view similar to 21, but illustrating another embodiment of this invention wherein the insert has been rotated 45° from the initially inserted position within the brick, and showing the insert welded to a sheet steel wall.

FIG. 23 is an isometric bottom view with portions broken away to show details of another embodiment of the invention, the insert being shown in its undeformed condition prior interlocked with the brick.

FIG. 24 is a fragmentary sectional view similar to FIG. 1, showing details of the recess of FIG. 23 prior to insertion of the insert.

FIG. 25 is a view similar to FIG. 3, showing the deformed insert interlocked within the recess of FIGS. 23 and 24.

FIG. 26 is a plan view of the undeformed insert of FIGS. 23-25.

FIGS. 27 and 28 are side and plan views respectively of a modified insert particularly suitable for use in the FIG. 31 construction.

FIGS. 29 and 30 are side and plan views respectively of another embodiment of an insert suitable for use in the FIG. 31 construction.

FIG. 31 illustrates another embodiment of the invention wherein the ceramic brick is secured to a support without recourse to welding.

FIG. 32 is still another embodiment of the present invention illustrating the ceramic brick secured to a substrate to welding.

FIG. 33 a fragmentary view sectioned through the recess of a green unfired brick of the type illustrated in FIGS. 23-25, illustrating the removal of the recess forming inserts from the newly molded brick. Other parts of the brick forming mold are not shown.

FIG. 34 is a perspective view of one of the recess forming inserts of FIG. 33. It is to be understood that the invention is not limited in its application to the details of construction and arrangement of parts illustrated in the accompanying drawings, since the invention is capable of other embodiments and of being practiced or carried out in various ways, and that the phraseology or terminology employed herein is for the purpose of describing the invention claimed in the appended claims.

DESCRIPTION OF THE INVENTION

Figure 1:
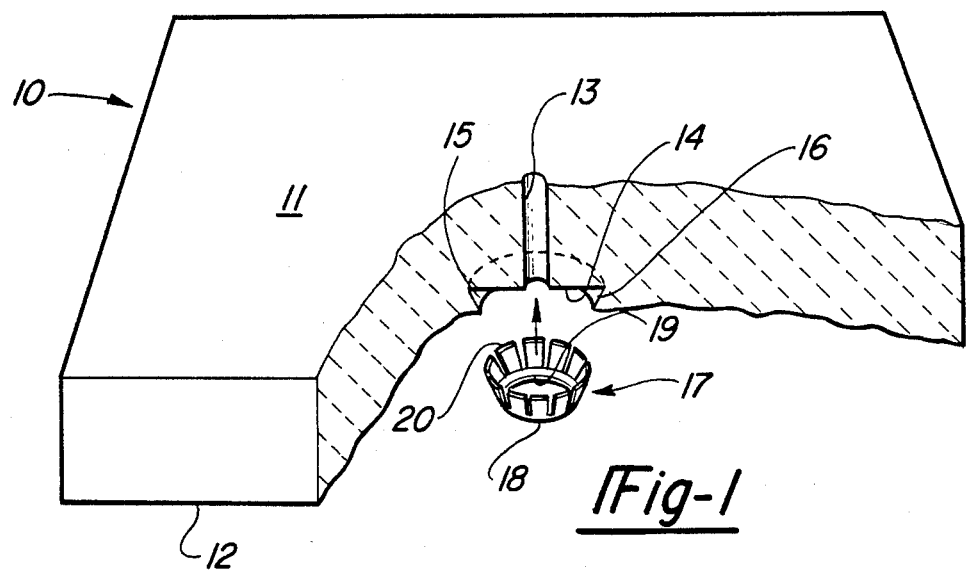
FIG. 1 is a fragmentary perspective view showing a brick embodying the present invention with a welding insert in position for insertion into the insert receiving recess of the brick.
Figure 2:
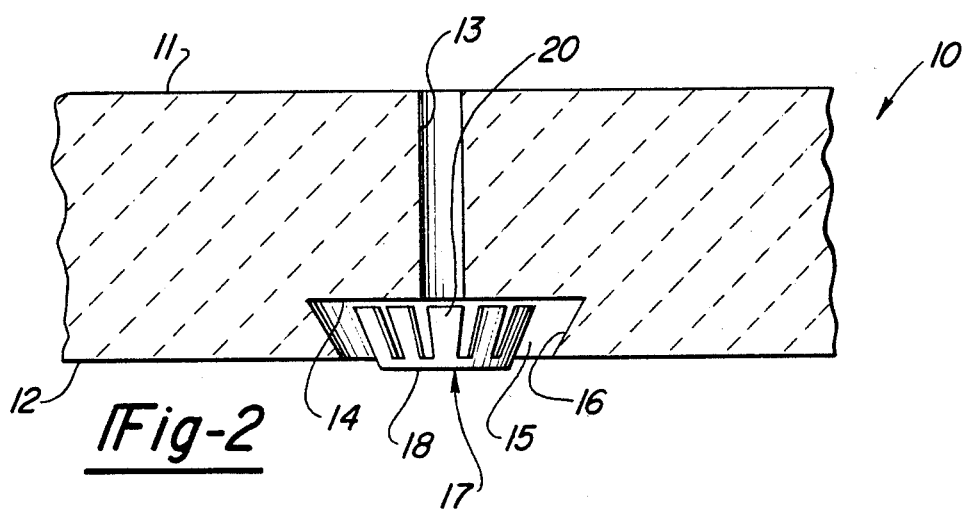
FIG. 2 is an enlarged fragmentary view similar to FIG. 1, showing the welding insert in a preliminary position within the brick prior to being deformed to its operative interlocked position.
Figure 3:
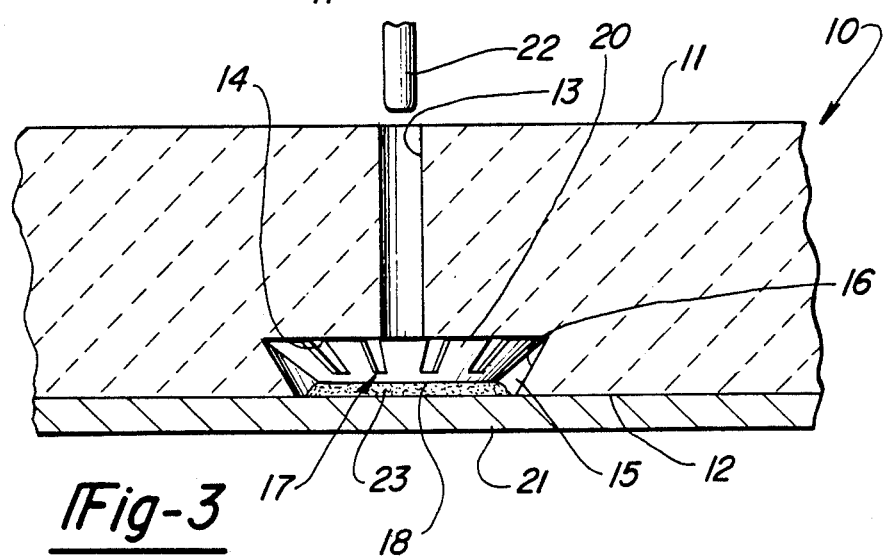
FIG. 3 is a view similar to FIG. 2 showing the welding insert deformed at its operating position and welded to a steel substrate for a wall to be protected.

Referring to FIGS. 1-3, an aluminum oxide ceramic brick 10 of approximately one-inch thickness is illustrated having approximately four-inch by six-inch rectangular outer and inner parallel faces 11 and 12. A small diameter guide hole 13 for a welding rod 22 extends normally through the face 11 at a central location for approximately three-quarters of an inch and enlarges radially to provide a plane ceiling 14 of approximately one square inch for a recess 15. From the outer periphery of the ceiling 14, the side walls 16 of the recess 15 converge conically and coaxially with guide 13 at approximately a thirty to forty-five degree angle to an insert receiving opening through face 12 into the recess 15.

A welding insert 17 may be formed from a mild steel or low carbon twelve gauge sheet steel blank to provide a plane annular base 18 having a central opening 19 of somewhat larger diameter than the diameter of the guide hole 13, and a plurality of diverging fingers or prongs 20 extending toward the ceiling 14, FIGS. 1-3. The prongs 20 in the undeformed condition shown in FIGS. 1 and 2 are dimensioned to pass with the base 19 readily through the insert receiving opening into the recess 15 and into sliding engagement with the ceiling 14. The prongs 20 are dimensioned so that upon the application of force urging the base 18 toward the ceiling 14, their outer ends will engage and slide along the extremely hard surface of the ceiling 14 and be deformed radially outwardly into the maximum diameter of the undercut recess 15, FIG. 3, without appreciably scratching the hard material of the ceramic brick 10. The insert 17 will thus be mechanically interlocked rigidly with the brick 10, and the base 18 will be spaced from the surface 12 within the recess 15 approximately a sixteenth of an inch to prevent being grounded by contact with the wall 21 until a molten pool 23 of welding rod material is formed to connect the base 18 and wall 21. The term "rod" as thus used and hereinafter will encompass elongate welding materials such as an electrically charged welding rod or wire used respectively in conventional arc of MIG welding.

As described above, the assembled brick 10 and welding insert 17 may then be shipped to the location where it is intended to be welded to the steel wall 21 or other backing to be protected from abrasion. At the welding site, the brick 10 is placed with its inner face 12 adjacent to the wall 21. A welding rod 22 is then inserted into the guide hole 13 and guided thereby coaxially through the opening 19 and into contact with the steel wall 21 without touching the insert 17. The arc welding operation is then carried out conventionally, such that the heat of the arc melts the end of the rod 22 in contact with the electrically grounded wall 21 and forms a pool of molten welding material 23 that hardens to provide a welded bond between the base 18 of the insert 17 and the wall 21.

Figure 4:
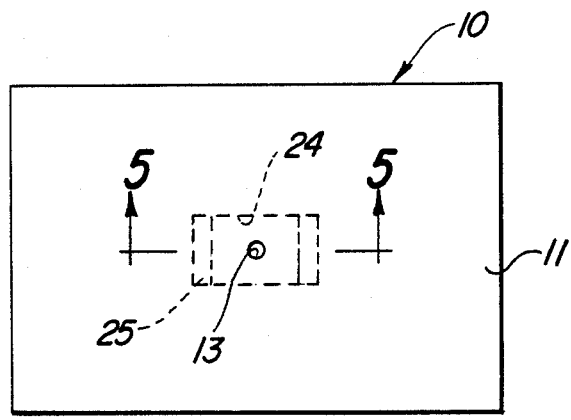
FIG. 4 is a plan view of another brick embodying a modification of the present invention.
Figure 5:
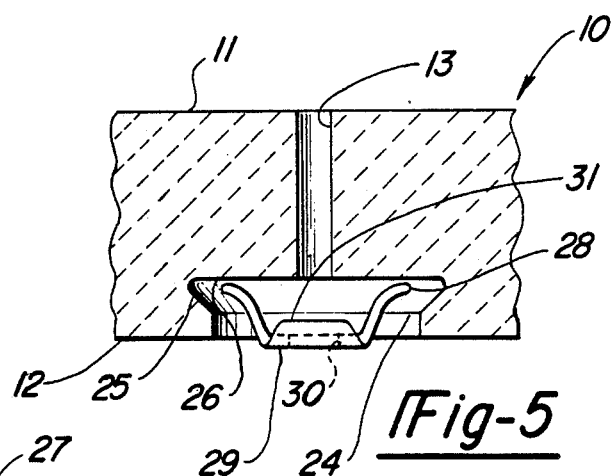
FIG. 5 is a fragmentary enlarged sectional view taken in the direction of the arrows substantially along the line 5—5 of FIG. 4,, showing a modified welding insert in position for deformation and interlocking with the brick.
Figure 6:
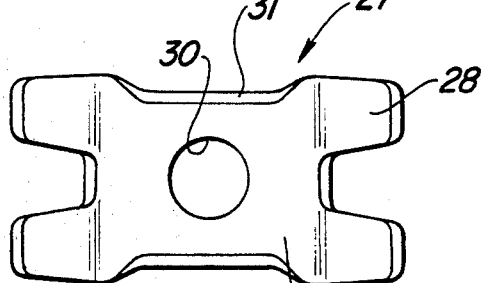
FIG. 6 is a plan view of the welding insert illustrated in FIG. 5.
Figure 7:
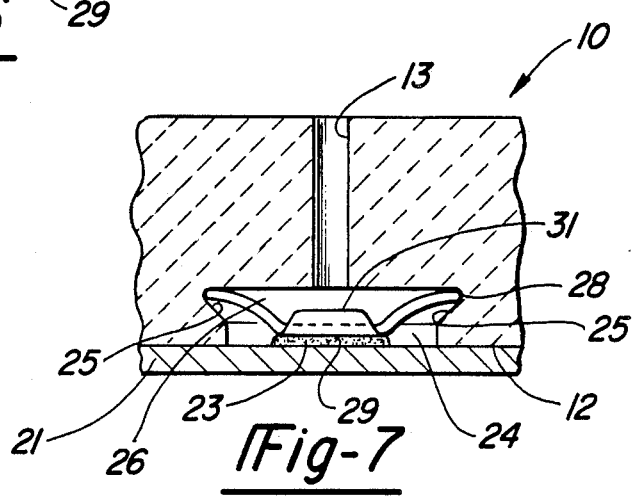
FIG. 7 is a view similar to FIG. 3, illustrating the modification of FIGS. 4-6 welded to a steel substrate.

FIGS. 4-7 illustrate a modification of the present invention wherein the recess 24 in the ceramic brick 10 is essentially square or rectangular, FIG. 4, and if rectangular is provided with undercuts 25 along the opposite shorter ends, such that the long dimension of the ceiling 26 of the recess 24 is aligned with the long dimension of the brick 10. Similarly to the modification illustrated in FIGS. 1-3, the end walls of the recess 24 converge from the undercuts 25 at approximately a thirty to forty-five degree angle from the ceiling 26 to within approximately one-eighth of an inch from the inner face 12, then extend essentially normally to that face (except for a small draft angle required to facilitate removal of the mold parts) to an approximately one square inch insert receiving opening into the recess 24 through the inner face 12. The aforesaid draft angle for the various embodiments illustrated herein will be nominal because immediately upon release of the molding pressure required to form the green brick, the newly formed and unfired brick will expand slightly to facilitate removal of the recess forming mold part or inserts.

The welding insert 27 may also be formed from a sheet metal stamping of the same material and thickness as the insert 17, and is formed with prongs 28 at opposite ends dimensioned to be readily inserted into the recess 24 into sliding abutment with the ceiling 26. Thus when the base 29 of the insert 27 is forced into the recess 24, the outer ends of the prongs 28 will slide along the ceiling 26 and be deformed into the undercuts 25 adjacent to the ceiling 26. In this regard, the outer portions of the prongs 28 may flare outwardly to faciliate their bending into the undercuts 25 with minimum stress at the junction of the prongs 28 with the base 29.

In other respects the structure and operation of the modification shown in FIGS. 4-7 are esentially the same as described in regard to FIGS. 1-3. The base 29 is provided with a central opening 30 coaxial with and somewhat larger than the guide hole 13 and reinforced by upturned lateral flanges 31 along the longer edges of the insert 27. When the insert 27 is finally deformed and interlocked with the brick 10, FIG. 7, the base 29 will be spaced within the recess 24 from the inner face 12 to the same extent that the base 18 is spaced from that face, thereby to enable the same welding procedure as described above.

The structure of FIGS. 1-3 will be used where a recess 15 of circular section is desired. The recess 15 may be readily carved while the brick 10 is still soft. Thereafter the brick is fired and hardened. The structure of FIGS. 4–7 is usually preferred where it is desired to mold the recess 24 by means of a multiple part die simultaneously with molding of the brick 10. Such a mold will be more complex than a mold required merely to shape the brick 10 and provide the small diameter guide hole 13, but will enable the formation of a more economical brick 10 in large quantities because the operation of cutting a conical recess 15 is avoided. Additionally, the rectangular recess 24 can be dimensioned to enable removal of lesser amounts of the brick across the small dimension of the recess 24 and thereby further minimize impact breakage.

FIGS. 8–11 illustrate simplified modifications of the invention where the forces tending to bow or bend the sides 31 of the insert 27 are comparatively small during use of the brick 10 in an abrasive environment. The insert 35 illustrated in FIGS. 8–9 is very efficient and easily manufactured and installed with the brick 10. In general, the brick 10 and its cooperation with the insert 35 are substantially as described above. The insert 35 may comprise a V-shaped stamping, rectangular in plan view and of the same material and thickness as the inserts 17 and 27. It is dimensioned in its undeformed condition to be inserted into the recess 24 through the rectangular insert receiving opening defined at the inner face 12 by the essentially vertical end walls 36 and side walls 37 of the recess 24. The legs of the stamping 35 diverge from the apex of the V at approximately 110°. After its insertion, the insert 35 is deformed by the application of force against the base 34 of the V in the direction toward the ceiling 26, thereby forcing the opposite ends of the insert 35 into the undercut portions 25 at the opposite ends of the recess 24.

The end walls of the undercuts 25 are rounded primarily to facilitate molding of the recess 24. The wall outer portion 38 of each undercut 25 diverges from the ceiling 26 at approximately a 20° angle to meet the essentially vertical end wall 36 at a location spaced from the surface 12 by at least approximately two hundredths of an inch and preferably not more than an eighth of an inch. Thus, when the insert 35 is forced into its interlocked position with the brick 10, its opposed ends will rest upon solid portions of the inclined surfaces 38, thereby to avoid chipping of the material of the brick 10 adjacent the insert receiving opening in face 12.

In the deformed condition, the V bottom 34 of the insert will be spaced approximately a sixteenth of an inch from the plane of the inner face 12 so as to readily contact the molten welding rod material and complete a weld 23, FIG. 9, to the steel substrate 21. The insert 35 is provided with a central welding rod hole 39 coaxial with and oversize with respect to the guide hole 13 to enable the welding as described above. Also, the insert 35 is formed so that when deformed as illustrated in FIG. 9, each leg of the V declines at a little less than approximately a 35° angle toward the plane of the surface 12 and meets the other leg at a rounded juncture at 34.

It will be appreciated that the weldable bricks described thus far may be readily used to line steel hoppers, chutes, or other conduits or surfaces that are accessible for welding through the guide holes 13. FIGS. 10 and 11 illustrate a situation wherein the brick 10 may be provided with an undercut recess 24 opening at its inner face 12 as described above, but the guide hole 13 for the welding rod is eliminated. In lieu thereof, a hole 40 is burned or cut into the steel substrate 21 at the location where the weld is desired. The brick 10 with an interlocked insert 41 is then aligned with the hole 40. The weld between the insert 41 and substrate 21 is then completed by conventional arc or MIG welding from the exterior of the substrate 21 through hole 40. The insert 41 may be identical with insert 35, except that the central hole 39 may be eliminated.

Figure 12:
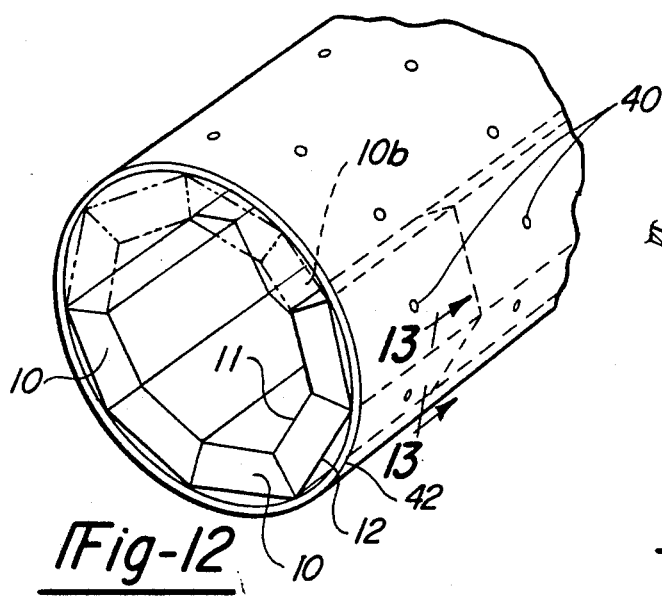
FIG. 12 is another modification illustrating the present invention in an application for lining the interior of a steel pipe.

FIG. 12 illustrates an application of the present invention lining a steel pipe for conveying abrasive materials. Large diameter pipes, for example two to four feet in diameter, may be welded to bricks 10 embodying the present invention from either the interior or exterior. As illustrated in FIG. 12, the opposite long sides of the bricks 10 are tapered to lie in radial planes extending longitudinally of the pipe 42. The bricks 10 may then be inserted into the pipe side by side circumferentially and end to end longitudinally and welded in place as described above and as illustrated by way of example in FIGS. 9, or 11. Smaller diameter pipes, or long pipes, will usually be welded from the exterior, as described in regard to FIG. 11, and illustrated in FIG. 13.

Figure 13:
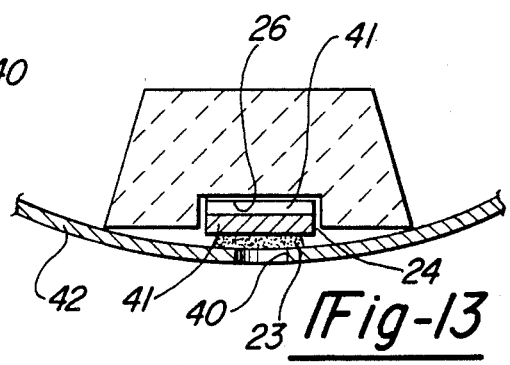
FIG. 13 is an enlarged fragmentary sectional view taken in the direction of the arrows substantially along the line 13—13 of FIG. 12, illustrating one of the bricks welded to the interior surface of the pipe.

Heretofore, pipes have been lined with abrasion resistant bricks installed entirely around the inner periphery of the pipe. The last brick 10b in each circle of bricks would be hammered into position to hold the other bricks in place. In the typical installation used for transmitting an abrasive slurry, usually less than half of the pipe is exposed to the slurry. Consequently, bricks around the upper portions of the pipe, required only to hold the remaining bricks in place, are a useless expense as far as resisting abrasion is concerned and add appreciably to the weight of the lined pipe. By virtue of the present invention, the key brick 10b is not necessary and bricks 10 are only welded in place as required within the pipe 42, as indicated by the solid line bricks 10, FIG. 12. Even if it is desirable to line the entire inner periphery of the pipe 42, as indicated by the bricks 10 and 10b shown in dashed line, the final brick 10b need not be precisely dimensioned and hammered into place because each brick is independently secured to the pipe 42 by welding.

Where the face 12 of the brick 10 confronting the interior of the pipe 42 is a plane surface defining a chord within the pipe 42, the insert 41 must be dimensioned so that its V-base in the deformed condition interlocked with the brick 10 will extend radially outward from the recess 24, FIG. 13, to assure the desired welding space of approximately one sixteenth of an inch from the inner periphery of the pipe 42. In other respects the insert 1 may be identical to the inserts described in regard to FIG. 8 or FIG. 10. Of course, the chordal space between the brick 10 and pipe 42 can be eliminated if desired by forming the brick 10 with a cylindrical surface 12 to mate with the inner periphery of the pipe 42. Inasmuch as FIG. 13 is a section transverse to the longitudinal axis of pipe 42, the undercuts 25 for the recess 24 are not clearly shown. However, the recess 24 in FIG. 13 may be identical with the recess 24 of FIGS. 8–11, wherein the longer dimension of the recess 24 in FIG. 13 preferably extends longitudinally of the pipe 42.

Figure 15:
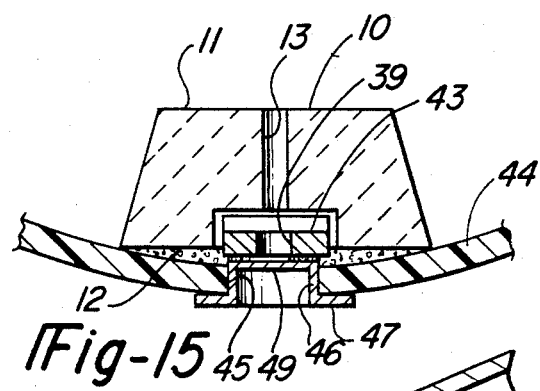
FIG. 15 is a view similar to FIG. 14, illustrating another modification of the invention.

FIG. 13 illustrates details of the pipe liner brick 10 provided with an undercut recess 24 and having an insert 41 secured therein. Holes 40 are cut through the pipe 42 at the locations where welding is required and each brick 10 is inserted into the pipe 42 with the center of its recess 24 aligned coaxially with the hole 40. Thereafter, the weld is completed as described in regard to FIG. 11. Where it is feasible to weld from the interior of the pipe, a brick 10 having the guide hole 13, FIG. 15, is located within the pipe as desired and the welding is completed as described herein.

Where pipes of smaller diameter are to be lined with ceramic bricks, the width of the brick between its tapered sides will be reduced so as to reduce the maximum distance between the interior of the pipe 42 and the adjacent surface 12 of the brick. In such instances, inasmuch as the width of the brick itself is reduced in its circumferential dimension, the width of the insert 41 between its longer edges, and also the width of the recess 24, will be correspondingly reduced. The length of the brick 10 need not be reduced. It is apparent from the foregoing that the concept of the various weldable bricks described herein may be used to line the plane wall 21 as in FIG. 3, or the curved wall 42 as in FIG. 12.

Figure 14:
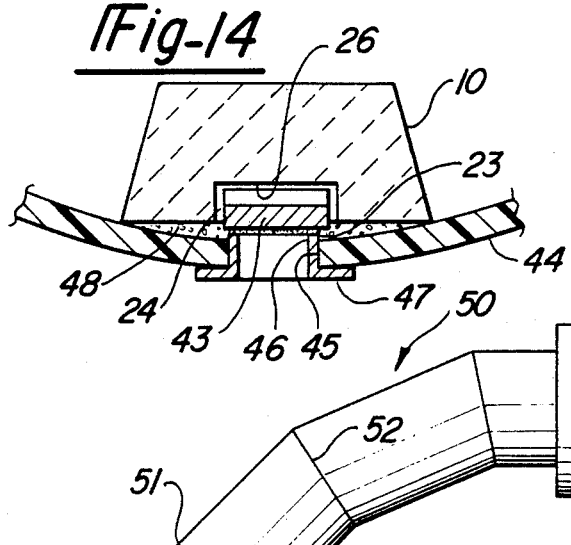
FIG. 14 is a view similar to FIG. 13, illustrating a modification of the invention adapted for use with a corrosion of nonweldable material.

In some instances, the walls to be protected must also be capable of resisting corrosive action that would destroy ordinary sheet steel and many other weldable metals. FIGS. 14 and 15 illustrate modifications of dielectric non-metallic corrosion resistant walls for use with any of the weldable bricks described herein, whether such walls are curved or plane.

The brick 10 of FIG. 14 may be shaped similarly to any of the bricks 10 described above and may also be provided with a weldable insert 43 similarly interlocked within recess 24. The insert may be similar in dimensions to any one of the inserts described herein, depending upon the shape of the recess therefore in the brick 10. For the purpose of illustration it is shaped like the insert 41. The pipe 44 in FIG. 14 is a dielectric material unsuitable for arc or MIG welding. Accordingly at a location aligned with the center of the insert 43, a hole 45 is cut through the wall of pipe 44 and a weldable corrosion resistant tubular grommet 46 of stainless steel for example, is secured within the hole 45, preferably so as to be frictionally retained in place. The tubular body of the grommet 46 extends radially through the wall of pipe 44 to the extent permitted by a coaxial annular flange 47 of the grommet 46 engaging adjacent exterior portions of the pipe 44 around the hole 45. The grommet 46 is preferably formed from stainless steel capable of being welded by arc or MIG welding to the insert 43, and both the grommet 46 and insert 43 are formed from weldable alloys capable of withstanding the corrosive abrasive mixture within the pipe 44.

The grommet 46 is dimensioned such that after its insertion through the hole 45 in alignment with the center of the insert 43 as illustrated in FIG. 14, it will be spaced sufficiently close to the V-base of the insert 43 to enable effective welding thereto. The grommet 46 is electrically grounded and welded to the adjacent portions of the insert 43 from the exterior of the pipe 44 by conventional arc or MIG welding to effect the weld 23 as described above. In this case, the material of the welding rod will also be resistant to the corrosive material within the pipe 44. A snug fit between the tubular body of the grommet 46 and the pipe 44, in cooperation with the weld 23 between the insert 43 and the inner end of the grommet 46 entirely around the latter, prevents leakage of the corrosive abrasive material from the pipe 44. Additionally, the chordal space between the brick 10 and the interior of the pipe 44 may be filled with a suitable corrosion resistant cement 48, as for example ordinary Portland cement that is forced axially along the pipe 44 from its ends.

FIG. 15 illustrates a similar concept wherein the welding is feasible from within the pipe 44. In this situation, the brick 10 is provided with guide hole 13 and interlocked insert 43 having a hole 39 coaxial with the guide 13. Except for being stamped from corrosion resistant weldable material and for the provision of hole 39, insert 43 of FIG. 15 may be the same as insert 43 of FIG. 14, or it may be similar to any of the other inserts described herein, such as insert 35. The inner end of the cylindrical grommet 46 in FIG. 15 may be closed by a unitary cap 49 to prevent leakage through the grommet 46. After the grommet 46 and guide hole 13 of the brick 10 are aligned, as in FIG. 15, the grommet 46 is electrically grounded and the MIG or arc welding is performed from within the pipe 44 through guide hole 13 as described in regard to FIGS. 8 and 9, for example. Thereafter, the space between the brick 10 and pipe 44 may also be filled with a suitable cement as described in regard to FIG. 14.

Figure 16:
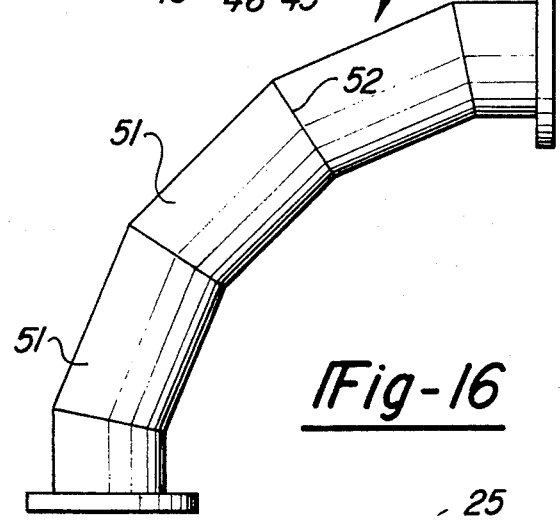
FIG. 16 is a plan view of a pipe elbow lined with ceramic bricks embodying the present invention.
Figure 17:
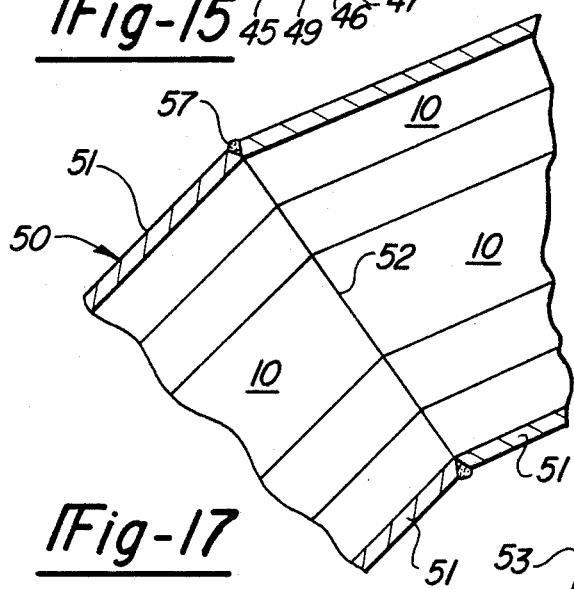
FIG. 17 is an enlarged fragmentary longitudinal sectional view showing the interior of the elbow.
Figure 18:
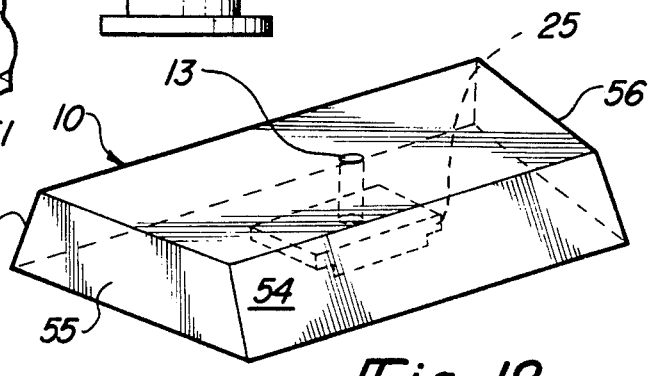
FIG. 18 is an isometric view of one of the bricks utilized in the elbow of FIG. 16.

FIGS. 16 through 18 illustrate an adaptation of the present invention for use in lining a tubular elbow 50 comprising a number of pipe sections 51 conventionally joined at mitered connections 52, as for example by welding, to effect in the present instance a 90° elbow. FIG. 18 illustrates an enlargement of one of the bricks 10 dimensioned for use in lining the separate sections 51. The opposite sides 53 and 54 of the brick 10 are preferably tapered so as to lie in radial planes extending longitudinally of the associated section 51. The opposite ends 55 and 56 are shaped so as to abut the adjacent end of the next endwise adjacent brick 10, which may be a brick in the next adjacent section 51. Preferably, each section 51 is lined with the bricks 10 before being joined to the next adjacent segment 51.

Any of the brick modifications described herein may be used to line the separate sections 51, but bricks of the type illustrated in FIGS. 8 and 9 are shown. In the present instance, the brick 10 of FIG. 18 is welded from the inside of the associated section 51, utilizing the guide hole 13, not shown, of FIGS. 8 and 9. After the bricks 10 are welded in place within the separate sections 51, the latter are then joined as for example by welding at 57 around their adjoining mitered edges 52, FIG. 17.

FIGS. 19 through 22 illustrate modifications of the present invention wherein the weldable insert is deformed and interlocked within undercut portions of the insert receiving recess of a half inch thick brick 10 by being rotated 45° to an interlocked position as described below. In FIG. 19, the insert 58 may comprise a sheet steel stamping of the same thickness and material as the inserts described above. The undercut 59 for the insert receiving recess 60 in the brick 10 undercuts the four sides 61 of the recess adjacent to the recess ceiling 62. The latter extends transversely of the guide hole 13, where used, FIGS. 19–21, and parallel to the surface 12, FIG. 22, and the four sides 61 extend essentially at right angles to the surface 12 to define approximately an inch square or slightly less recess receiving opening (in a four inch by six inch brick 10) dimensioned to receive the weldable insert 58 freely therein.

The insert 58 has a plane base 63 provided with a hexagonal hole 64 coaxial with and slightly larger in diameter than guide hole 13. From the base 63, each pair of opposite sides 65 of the insert 58 diverge from each other toward the ceiling 62 to their outermost edges 66. The latter define the essentially square plan view of the insert 58, but the corner portions 67 of the otherwise square edges 66 bend downward slightly to an extent preferably not greater than the thickness of the sheet steel material from which the retainer 58 is stamped. Approximately the central half of each of the edges 66 lies in a common plane, such that approximately only a quarter of an inch of each edge 66 bends downwardly at the corner portions 67.

When the insert 58 is inserted into the recess 60, the edges 66 lie flush with the ceiling 62. The depth of the undercut 59 in the axial direction of the guide hole 13, FIGS. 21 and 22, is slightly greater than the thickness of the edges 66. Thus the undercuts are dimensioned to receive the edges 66 and to effect an interference fit with the depressed corners 67 when the insert 58 is rotated 45° in either direction from the initial inserted position. Rotation of the insert 58 may be accomplished by means of a tool fitting closely within the hexagonal opening 64, which preferably is reinforced by upwardly punched portions 68 of the base 63 that define the hole 64.

When the insert 58 is rotated from its initial installed position adjacent to the ceiling 62, FIG. 21, to the deformed position illustrated in FIG. 22, or FIG. 20, dotted lines, the edges 66 initially clear the adjacent lower surfaces of the undercuts 59 opposite the ceiling 62. Upon continued rotation, the declined portions 67 engage the aforesaid lower surfaces of the undercuts 59 and are deformed by cam action toward the ceiling 62. The insert 58 is thus frictionally and mechanically interlocked by the deformation within the recess 60 when the rotation continues 45° from the FIG. 21 position to the FIG. 22 position. The lateral extent of the undercuts 59 is determined so as to receive the corners 67 when these are deformed upwardly toward the plane of the edges 66, dotted lines, FIG. 20. After the insert 58 is interlocked within the recess 60, the brick 10 of FIGS. 19–21 is used as a transportable self-contained assembly for welding to a wall to be protected, as described above.

FIGS. 21 and 22 illustrate respectively the concept of the weldable brick 10 and interlocked insert 58 within a recess 60 wherein the brick 10 is welded by use of guide hole 13 from the interior of a chute or conduit, as described in regard to FIG. 8 and 9, and the concept wherein the guide hole 13 is not used and the brick 10 is welded to the exterior of a wall 21 through hole 40 therein as described in regard to FIGS. 10 and 11. The bricks 10 of FIGS. 19–22, as is also true of other bricks 10 described herein, may also be welded to grommets or buttons 46 secured to dielectric walls as illustrated in FIGS. 14 and 15.

FIGS. 23–26 illustrate another concept of the present invention that facilitates molding of the brick 10 having a recess 70 for receiving a welding insert 71 and enables use of a comparatively simple multiple part mold, FIGS. 33, 34. The brick 10 may or may not be provided with a guide hole 13, depending upon the application as described above. Similarly to the above described recesses, the recess 70 has a rectangular inner insert receiving opening at the brick surface 12, a ceiling 72 parallel to the surface 12, and orthogonal lateral walls 73 and end walls 74 that are also essentially normal to the ceiling 72.

The welding insert 71 may be stamped from sheet steel as described above to provide an approximately 110° V-shaped insert, FIG. 24, having a pair of legs 75 offset from each other at opposite sides of the longitudinal mid-plane of the insert 71, FIGS. 23 and 26, and projecting endwise in opposite directions. The recess 70 has a pair of undercuts 76 at its opposite ends and offset from each other to receive the ends of the legs 75.

Similarly to the structure illustrated in FIG. 9, for example, the insert 71 is readily insertable through the inner recess opening, with the legs 75 diverging from the centrally located V-apex 77 toward the ceiling 72, which extends endwise into the offset undercuts 76. Flattening force applied against the mid-region 77 toward the ceiling 72 forces the ends of the legs 75 to slide endwise along the ceiling 72 into the mating undercuts 76 to interlock the insert 71 and brick 10. Each leg 75 is offset laterally from the other and extends endwise approximately 20% of the overall length of the insert 71 from a transverse edge 78 of the insert body. At the region of each transverse edge 78 of the deformed insert 71, the ceiling at the same lateral half of the recess 70 slopes endwise toward the inner recess opening and terminates at the surface 12 to provide a ramp 79. Each ramp 79 extends transversely of the recess 70 from the adjacent lateral wall 73 to the longitudinal mid-plane of the recess 70 and thus defines a wall 80 that extends along the latter mid-plane for the extent of the ramp 79. When used with a brick 10 having a guide hole 13, a hole 81 is provided centrally within the insert 71 to enable welding as described above.

By virtue of the structure described and illustrated in FIGS. 23–26, a multiple part mold may be used to form the brick 10. Numerous multiple part molds are well known to the art and the molding operating itself may be conventional. These are accordingly not described in detail herein, except to the extent that a pair of identical recess forming mold parts or inserts 84, FIGS. 33, 34, are located within the mold cavity to form the recess 70. Each recess forming part 84 is suitably supported within the mold cavity to form one lateral half of the entire recess 70 and may comprise a plane ceiling forming surface 87 for forming one lateral half of the ceiling 72, a ramp forming curved portion 88 at one end of the surface 87 for forming one of the ramps 79, an undercut forming projection 89 at the opposite end of the surface 87 for forming the associated undercut 76, an endwall forming portion 90 adjacent to the portion 89 for forming the associated end wall 74, a lateral wall forming side 91 for forming the associated lateral wall 73, and an opposite side 92 for forming the mid-plane wall 80. Suitable means such as a depending stem 93 may be provided to facilitate removal of the associated part 84 from the recess 70 upon completion of the molding operation. During the molding operation the dry powdered material for forming the brick 10 is compacted within the mold under a pressure of approximately 3500 psi. When the mold is opened to expose the green newly compressed brick and to release the molding pressure, the brick will initially expand slightly. Such expansion facilitates removal of the recess forming inserts 84 which may then be gripped, as for example by the stems 93, and withdrawn from the recess 70 in directions along the ramps 79 and away from the ceiling 72, as illustrated in FIG. 33.

FIG. 31 illustrates a concept of the present invention wherein welding inserts, such as the inserts 71, may be employed to interlock with a hardenable plastic poured in a fluid condition into the recesses of a number of bricks 10. The bricks 10, interlocked with any one of the inserts described herein, such as the inserts 71 by way of example, are placed side by side, with the recesses 70 up, on the surface on a supporting form or mold 94 having a raised border 95. A hardenable thermoplastic or thermosetting plastic 96 in a low viscosity fluid condition is poured over the layer of bricks 10 to a desired depth of say one-quarter inch to an inch or more. The low viscosity plastic 96 readily flows into the recesses 70 and through the holes 81 and between the edges of the inserts 71 and recess walls to completely fill each recess 70 and interlock with the inserts 71 after hardening.

The flat form 94 is suitable for use with a hardenable thermoplastic and may be provided with a riser 97 confining the outermost edges of the bricks 10. Also if desired the form 94 may be provided with a peripheral step 98 between the riser 97 and border 95 and flush with the upper surface 12 of the adjacent bricks 10, so that the overlying plastic 96 when hardened will form an extension 96a that can be drilled and bolted to a structure to be protected after the hardened plastic 96 and interlocked bricks are removed from the form 94. In lieu of the extension 96a, the upper surface of the hardened plastic 96 may be cemented or otherwise secured to the structure to be protected by the abrasive and impact resistant bricks 10.

For use with thermosetting plastics or to form interlocked assemblies of plastic 96 and bricks 10 of curved or other than flat contours, a second mold part may be used in cooperation with the support 94 to confine the bricks 10 and plastic 96 therebetween in accordance with conventional molding practice to form any desired shape.

Also where it is desired to emphasize the interlocking between the plastic 96 and metal insets 71, the latter may be modified in various ways, as illustrated in FIGS. 27, 28, and FIGS. 29, 30 by way of example. In FIGS. 27, 28, the hole 81 is eliminated and a pair of prongs 99 are lanced from the body of the insert 71 to enhance the above mentioned interlocking. In FIGS. 29, 30, an unbroken loop 100 is lanced from the body of the insert 71 to effect an even stronger interlock. Also within the concept of the present invention, the undercut portion of the recesses 70 may be increased to enable elimination of the metal insert. In that situation, the interlock between the block 10 and plate 96 may be effected solely by reason of the undercut recess 70.

FIG. 32 illustrates a modification of the invention where the bricks 10 are bonded directly to a structural member to be protected, which may be a steel plate 101 or other rigid substrate. The surface 102 of the plate 101 to be protected is preferably roughened, as for example by shot blasting, to enhance adherence to an adhesive. The plate 101 replaces the form 94, although a border 103 may be clamped to the roughened surface 102 to limit lateral flow of the adhesive. Thereafter the surface 102 is buttered with a suitable fluid adhesive 104, which may comprise an epoxy or other resin, and a layer of bricks 10 is pressed, with the recesses 70 down, on the adhesive 104 before it hardens, thereby to force the adhesive upwardly into the recesses 70 and around the insert 71 to mechanically interlock therewith upon hardening. Although the smooth hard surface of the bricks 10 confronting the steel surface 102 is not amenable to secure bonding merely by means of an adhesive, the interlock between the adhesive 104 within the recesses 70 and around the inserts 71 effects the desired strong bond for securing the abrasion and shock resistant bricks 10 to the substrate 101. Also as described in regard to FIG. 31, the undercut portions of the recesses 70 may be enlarged to effect the desired interlock with the adhesive 104 without recourse to metal inserts.

I claim:

1. An abrasion resistant weldable brick adapted to be welded to a weldable backing, said brick having inner and outer faces and a recess therein opening at the inner face of said brick in a direction transverse to said inner face, said recess having an interior ceiling transverse to said direction and spaced from the opening at said inner face, said recess enlarging adjacent to said ceiling with respect to said opening to effect an insert receiving undercut, a weldable insert within said recess, said insert having a central base and means for interlocking said insert within said recess comprising portions of said insert extending from said base into said undercut and deformed into mechanical interlocking engagement with portions of said brick defining said undercut.

2. A brick according to claim 1, said insert prior to interlocking with said brick having an undeformed condition dimensioned for insertion into said recess through said opening and also having deformable portions forceable into said interlocking engagement within said undercut.

3. A weldable brick according to claim 2, wherein said insert comprises a unitary structure having edge portions engageable in said undeformed condition with said ceiling for sliding therealong into said undercut upon the application of force urging said base toward said ceiling.

4. A brick according to claim 3, said edge portions comprise the outer edges of prongs diverging from said base and adapted in the undeformed condition to extend angularly from said base toward said ceiling in the directions toward said undercut.

5. A brick according to claim 4, said recess having orthogonal long and short dimensions transverse to said direction, said undercut comprising undercut portions adjacent to said ceiling at the opposite ends of the long dimension of said recess, said prongs diverging in opposite directions from said base toward said opposite ends and extending into said undercut portions at said opposite ends.

6. A weldable brick according to claim 2, said recess being generally square in section transverse to said direction and said undercut comprising undercut portions adjacent to said ceiling along the edges of said recess, said insert in its undeformed condition being rotatable within said recess for forcing said deformable portions into said undercut.

7. A brick according to claim 6, said insert having a portion exposed at said opening for engaging a tool to be rotated thereby.

8. A brick according to claim 1, the base of said insert having an opening for passage of an electrically charged welding rod in said direction through said insert and into contact with said backing, means for closely confining and guiding said welding rod into said recess and into contact with said backing comprising a guide hole extending in said direction through said outer face and ceiling coaxially with said opening in said base.

9. A brick according to claim 8, the diameter of said guide hole being not greater than approximately three-sixteenths of an inch and said opening in said insert being approximately the diameter of said guide hole.

10. A brick according to claim 9, the distance in said direction between said ceiling and a transverse plane across the opening of said recess at said inner face being approximately one-quarter of an inch.

11. A brick according to claim 1, said brick having a long dimension and a pair of edges spaced by a shorter dimension, said edges lying in planes converging in said direction from said inner face to said outer face to facilitate use of said brick within a tubular backing.

12. A brick according to claim 11, the base of said insert having an opening for passage of an electrically charged welding rod in said direction through said insert and into contact with said backing, means for closely confining and guiding said welding element into said recess and into contact with said backing comprising a guide hole extending in said direction through said outer face and ceiling coaxially with said opening in said base.

13. An abrasion resistant brick according to claim 1, and a weldable backing having a passage therethrough and also having portions adjacent to one side thereof around said passage for welding to said base, said passage through said backing providing access for welding said portions of said backing to said base from a side of said backing opposite said one side.

14. The combination according to claim 13, and a dielectric substrate having said weldable backing confined therein, said portions of said backing adjacent to said one side thereof being also adjacent to one side of said substrate, said passage extending through said substrate and providing access for welding said portions of said backing to said base from a side of said substrate opposite said one side thereof.

15. The combination of a tubular conduit and a lining for said conduit, said lining comprising a plurality of abrasion resistant bricks lying side-by-side circumferentially of the interior surface of said conduit and extending end-to-end longitudinally of said interior surface, each brick having inner and outer faces, said inner face confronting said interior surface and having an insert receiving recess therein opening in a direction toward said interior surface, said recess having a ceiling transverse to said direction and spaced from the opening in said inner face, said recess enlarging adjacent to said ceiling with respect to said opening to effect an insert receiving undercut, and a weldable insert within said recess, said insert having a base adjacent to and confronting said interior surface at said opening, at least the portion of said interior surface confronted by said base comprising a backing of weldable material, said base being welded to the confronting weldable portion of said interior surface, said insert having portions deformed into said undercut for mechanically interlocking said insert within said recess.

16. The combination according to claim 15, said insert prior to interlocking with said brick having an undeformed condition dimensioned for insertion into said recess through said opening and also having deformable portions forceable into said interlocking engagement within said undercut.

17. The combination according to claim 16, said tubular conduit comprising a weldable metallic pipe and said backing comprising a portion of said pipe.

18. The combination according to claim 16, said tubular conduit comprising a dielectric material, said backing comprising a grommet confined within a hole in said conduit and having a peripheral portion of weldable material confronting said base of said insert and welded thereto, the opening in said grommet providing access for welding said peripheral portion to said base from the exterior of said conduit.

19. The combination according to claim 16, the base of said insert having an opening for passage of an electrically charged welding rod in said direction through said insert and into contact with said backing, means for closely confining and guiding said welding element into said recess and coaxially through said opening in said base into contact with said backing comprising a guide hole extending in said direction through said outer face and ceiling coaxially with said opening in said base.

20. The combination according to claim 19, said tubular conduit comprising a weldable metallic pipe and said backing a portion of said pipe.

21. The combination according claim 19, said tubular conduit comprising a dielectric material, said backing comprising a button confined within said conduit and having a portion of weldable material confronting said opening in said base of said insert and welded to said base around the latter opening.

22. An abrasion resistant brick having inner and outer faces and a recess opening thereinto through said inner face, and being attachable to an auxiliary surface by means of a deformable insert insertable through the opening in said inner face into said recess, said recess having an interior ceiling spaced from said inner face, said recess enlarging adjacent to said ceiling to provide an undercut with respect to said opening for receiving portions of said insert deformed into said undercut, and said brick defining sidewalls of said recess extending transversely of said inner face entirely around said recess.

23. A brick according to claim 22, means for attaching said brick to a surface to be protected by the outer surface of said brick comprising a layer of plastic material over the inner surface of said brick and filling said recess and interlocked with portions of said brick defining said undercut, said plastic material comprising the hardened product of a hardenable fluid.

24. A brick according to claim 23, and also an insert within said recess having portions extending into said undercut in interlocking engagement with portions of said brick defining said undercut, said insert also interlocking with said plastic material.

25. A brick according to claim 22, and a substrate to be protected having a surface confronting the inner surface of said brick, and an adhesive bonded to said substrate surface and filling said recess and interlocked with portions of said brick defining said undercut.

26. A brick according to claim 22, and also an insert within said recess having portions extending into said undercut in interlocking engagement with portions of said brick defining said undercut, said insert also interlocking with said adhesive.

27. A brick according to claim 22 in combination with an insert dimensioned for passage transversely to said inner surface through said opening into said recess and deformable into said undercut for interlocking with said brick.

* * * * *